(12) United States Patent
Chisholm et al.

(10) Patent No.: US 11,111,056 B2
(45) Date of Patent: Sep. 7, 2021

(54) BOWL AND BOWL ASSEMBLY

(71) Applicants: Ryan T. Chisholm, Newbury Park, CA (US); Benjamin R. Newlin, Thousand Oaks, CA (US)

(72) Inventors: Ryan T. Chisholm, Newbury Park, CA (US); Benjamin R. Newlin, Thousand Oaks, CA (US)

(*) Notice: Subject to any disclaimer, the term of this patent is extended or adjusted under 35 U.S.C. 154(b) by 134 days.

(21) Appl. No.: 16/450,213

(22) Filed: Jun. 24, 2019

(65) Prior Publication Data
US 2020/0198837 A1    Jun. 25, 2020

Related U.S. Application Data

(60) Provisional application No. 62/781,821, filed on Dec. 19, 2018.

(51) Int. Cl.
| | |
|---|---|
| *A47G 19/23* | (2006.01) |
| *A47G 19/00* | (2006.01) |
| *A47J 47/00* | (2006.01) |
| *B65D 1/22* | (2006.01) |
| *B65D 21/00* | (2006.01) |
| *B65D 21/02* | (2006.01) |
| *A47G 19/12* | (2006.01) |
| *A47G 19/02* | (2006.01) |
| *A47J 43/07* | (2006.01) |

(52) U.S. Cl.
CPC ......... *B65D 21/0233* (2013.01); *A47G 19/12* (2013.01); *A47G 19/02* (2013.01); *A47G 19/23* (2013.01); *A47J 43/0727* (2013.01)

(58) Field of Classification Search
CPC ........ A47G 19/12; A47G 23/02; A47G 19/22; B65D 21/0233; B65D 21/04; B65D 21/0224
USPC .......... 220/574, 23.83, 912; 222/143, 465.1; D7/533, 540, 543, 397, 606, 318, 584, D7/505, 554.2, 612; 248/311.2
See application file for complete search history.

(56) References Cited

U.S. PATENT DOCUMENTS

| | | | | |
|---|---|---|---|---|
| D49,777 | S | * 10/1916 | Kindt | .......................... D11/154 |
| 1,394,540 | A | 10/1921 | Diack | |
| 2,327,078 | A | * 8/1943 | Teetor | .................... A47G 23/02 220/23.83 |
| 2,563,352 | A | * 8/1951 | Morse | ..................... B65D 3/22 206/515 |
| 2,625,274 | A | 1/1953 | Macmillan | |
| 3,208,631 | A | * 9/1965 | Edwards | ............... B65D 1/265 206/519 |

(Continued)

*Primary Examiner* — Gideon R Weinerth
(74) *Attorney, Agent, or Firm* — Suzanne Kikel, Patent Agent

(57) ABSTRACT

A mixing bowl with protuberances one the outer surface of the side wall of the bowl. A first mixing bowl has a diameter greater than a second mixing bowl. The two bowls form a mixing bowl assembly wherein the protuberances of the inner bowl contact and abut the inner surface of the outer bowl to define a clearance gap between the two bowls, wherein if the bowls cool at different rates after being washed, the mixing bowls are not jammed together. Each protuberance extends outwardly about one-fourth inch and the gap defined between the bowls has a clearance dimension of about one-fourth inch. The inner bowl has three or four protuberances and the outer bowl has four protuberances. The mixing bowls are made of stainless steel.

3 Claims, 4 Drawing Sheets

(56) References Cited

U.S. PATENT DOCUMENTS

| | | | | |
|---|---|---|---|---|
| 3,358,878 A * | 12/1967 | Ostborg | | A47G 19/23 206/514 |
| 3,401,862 A * | 9/1968 | Wanderer | | 229/400 |
| 3,896,928 A * | 7/1975 | Forte | | B65D 5/5016 206/779 |
| 4,419,103 A * | 12/1983 | Balkan | | B05C 11/08 118/18 |
| 5,139,801 A | 8/1992 | de Jesus Montemayor et al. | | |
| 5,160,377 A | 11/1992 | de Jesus Montemayor et al. | | |
| 5,392,948 A * | 2/1995 | McEntee | | A47G 19/23 220/574 |
| 5,419,454 A * | 5/1995 | Stowell | | A47J 43/0727 220/574 |
| 5,762,195 A * | 6/1998 | Stevens | | A47G 19/23 206/499 |
| D512,604 S * | 12/2005 | Panepinto | | A47G 19/23 D7/505 |
| D513,931 S * | 1/2006 | Liu | | D7/511 |
| 7,137,509 B1 * | 11/2006 | Burns | | A47G 19/23 206/516 |
| D539,093 S * | 3/2007 | Robinson | | A47G 19/23 D7/545 |
| D701,088 S * | 3/2014 | Hone | | B65D 5/5016 D7/505 |
| 9,314,122 B2 * | 4/2016 | Bodum | | A47J 36/06 |
| D839,973 S * | 2/2019 | Hochstrasser | | B65D 1/265 D21/661 |
| D884,427 S * | 5/2020 | Hendifar | | A47G 23/02 D7/523 |
| D898,520 S * | 10/2020 | Katopis | | D7/523 |
| 2008/0067180 A1 * | 3/2008 | Schanche | | A47G 19/02 220/574 |
| 2008/0078824 A1 * | 4/2008 | Spriegel | | B65D 81/3876 229/403 |
| 2013/0133288 A1 * | 5/2013 | Kaslik | | B65B 17/00 53/396 |
| 2017/0081078 A1 * | 3/2017 | Maple | | A47G 19/02 |
| 2018/0099231 A1 * | 4/2018 | Schwartz | | A63H 33/046 |
| 2018/0132665 A1 * | 5/2018 | Brown | | A47G 19/10 |
| 2020/0198837 A1 * | 6/2020 | Chisholm | | B65D 21/0233 |

* cited by examiner

BOWL AND BOWL ASSEMBLY

CROSS REFERENCE TO RELATED APPLICATIONS

This application claims priority to U.S. Provisional Patent Application Ser. No. 62/781,821 filed Dec. 19, 2018, entitled Perfect Mixing Bowl, the disclosure of which is incorporated herein by reference in its entirety.

BACKGROUND OF THE INVENTION

1. Field of the Invention

The present invention relates, in general, to cooking, and, more particularly, to cooking accessories.

2. Brief Description of the Prior Art

After use, most mixing bowls are washed. Washing may generally involve the immersing of the bowls in very hot water. After washing, the bowls may be stacked together for storage. Oftentimes, these bowls are stacked when they are still hot. While this seems convenient, the heated bowls often expand.

When two hot bowls are stacked together, one bowl, generally the outside bowl, cools faster than the other, generally the inside bowl. This difference in cooling rate, often causes the bowls to jam together. In some cases, this jamming is so severe that the bowls may break during the effort to release them. At the least, it is difficult, onerous and time consuming to separate such jammed bowls.

There is a need in the art to provide a means to allow hot bowls to be stacked together without having them jam together during cooling.

SUMMARY OF THE INVENTION

The invention provides such a need. In the invention, a bowl with a plurality of protuberances on the outer surface of a side wall is provided. In a further embodiment of the invention, an assembly of such bowls is provided. In the assembly of the bowls, a first bowl and a second bowl are provided. The bowls comprise a plurality of protuberances on the outer surface of a side wall of each bowl. In order for the first bowl and the second bowl to be assembled, stacked or nested within each other, the second bowl has a diameter that is less than the diameter of the first bowl. When the second bowl is positioned within the first bowl, the protuberances of the second bowl contact the inner surface of the first bowl; and a gap is created between the two bowls so that when the two bowls cool at different cooling rates after being washed with hot water, the bowls, in general, are not jammed together such that they cannot come apart easily, nor do they stick together. In an embodiment of the invention, the first bowl and the second bowl are mixing bowls.

The first bowl and second bowl both comprise a side wall having an inner surface, an outer surface, and a rim, and a plurality of protuberances on the outer surface of the side wall, each protuberance extending outwardly from the outer surface of the side wall. The protuberances on the side wall of the second bowl contact the inner surface of the side wall of the first bowl to create a gap between the inner surface of the first bowl and the outer surface of the second bowl.

Each protuberance on the outer surface of the side wall of the first bowl extends outwardly by approximately one-fourth (¼) inch; each protuberance on the outer surface of the side wall of the second bowl extends outwardly by approximately one-fourth (¼) inch; and the gap defined between the inner surface of the first bowl and the outer surface of the second bowl has a clearance dimension of about one-fourth (¼) inch.

In an embodiment of the invention, the first bowl which is the outer or larger bowl in the bowl assembly of the invention consists of four protuberances; while the second bowl which is the inner or smaller bowl of the bowl assembly of the invention consists of three protuberances on the outer surface of its side wall. These protuberances are semi-spherical in shape.

These and other features, methods, and advantages of the present invention will be better appreciated and understood when the following description is read in light of the accompany drawings.

BRIEF DESCRIPTION OF THE DRAWINGS

The components in the figures are not necessarily to scale, emphasis instead being placed upon illustrating the principles of the invention. Moreover, in the figures, like referenced numerals designate corresponding parts throughout the different views.

DETAILED DESCRIPTION OF THE INVENTION

Figure 1:
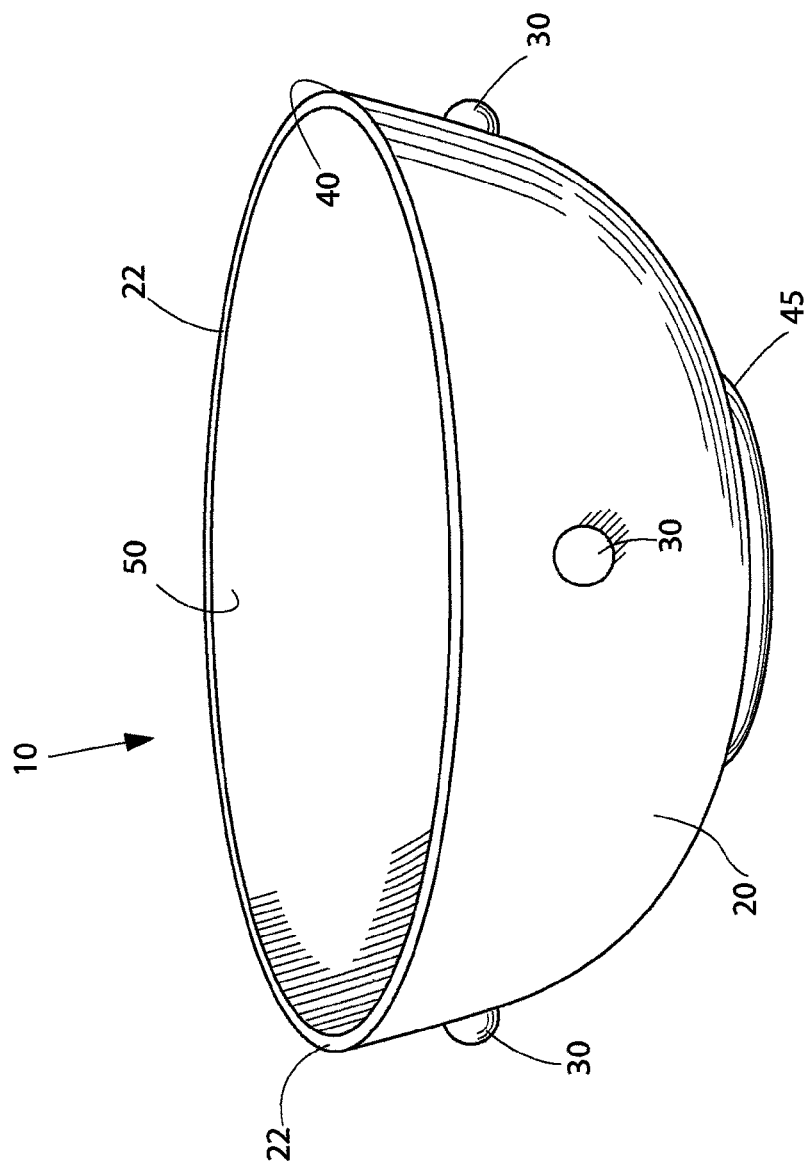
FIG. 1 is a front perspective view of a first bowl of the present invention.

Referring to FIG. 1, the present invention is embodied in a first circular bowl 10 having a side wall 20 extending around the entire circumference of the bowl 10 and which side wall 20 terminates in an upper circular rim 22. Side wall 20 has an outer surface 40 and an inner surface 50. In an embodiment of the invention, bowl 10 is a mixing bowl and in a further embodiment of the invention, bowl 10 is a stainless-steel mixing bowl. Still referring to FIG. 1, the outer surface 40 of side wall 20 of bowl 10 has a plurality of protuberances 30 circling around bowl 10 and located about mid-way down the length of side wall 20. As shown in FIG. 1, protuberances 30 extend outwardly from the outer surface 40 of side wall 20. Protuberances 30 are semi-spherical in shape. Bowl 10 also has a circular base 45 for allowing bowl 10 to rest on a surface in a manner well-known to those skilled in the art.

Figure 2:
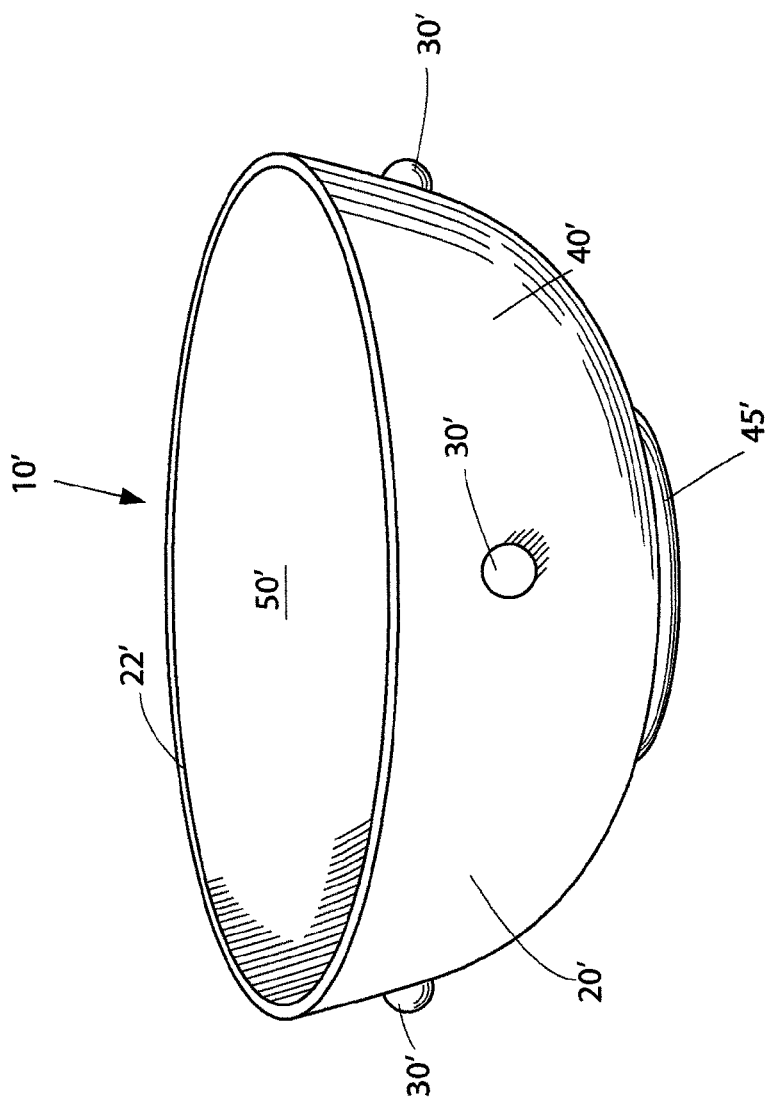
FIG. 2 is a front perspective view of a second bowl of the present invention.

Referring to FIG. 2, a second circular bowl 10' is illustrated. Second circular bowl 10' has a side wall 20' that extends around the entire circumference of bowl 10' and which side wall 20' terminates in an upper circular rim 22'. In an embodiment of the invention, second bowl 10' is a mixing bowl and in a further embodiment of the invention, second bowl 10' is a stainless-steel mixing bowl. Side wall 20' has an outer surface 40' and an inner surface 50'. Still referring to FIG. 2, side wall 20' of second bowl 10' has a plurality of protuberances 30' circling around bowl 10' and located about mid-way down the length of side wall 20'. As shown in FIG. 2, protuberances 30' extend outwardly from the outer surface 40' of side wall 20' of second bowl 10'. Protuberances 30' are semi-spherical in shape. Second bowl 10' has a circular base 45' for allowing bowl 10' to rest on a surface in a manner well-known to those skilled in the art. When first bowl 10 and second bowl 10' are stacked or nested together in a bowl assembly, circular base 45' will abut against the inner surface 50 of first bowl 10.

Figure 3:
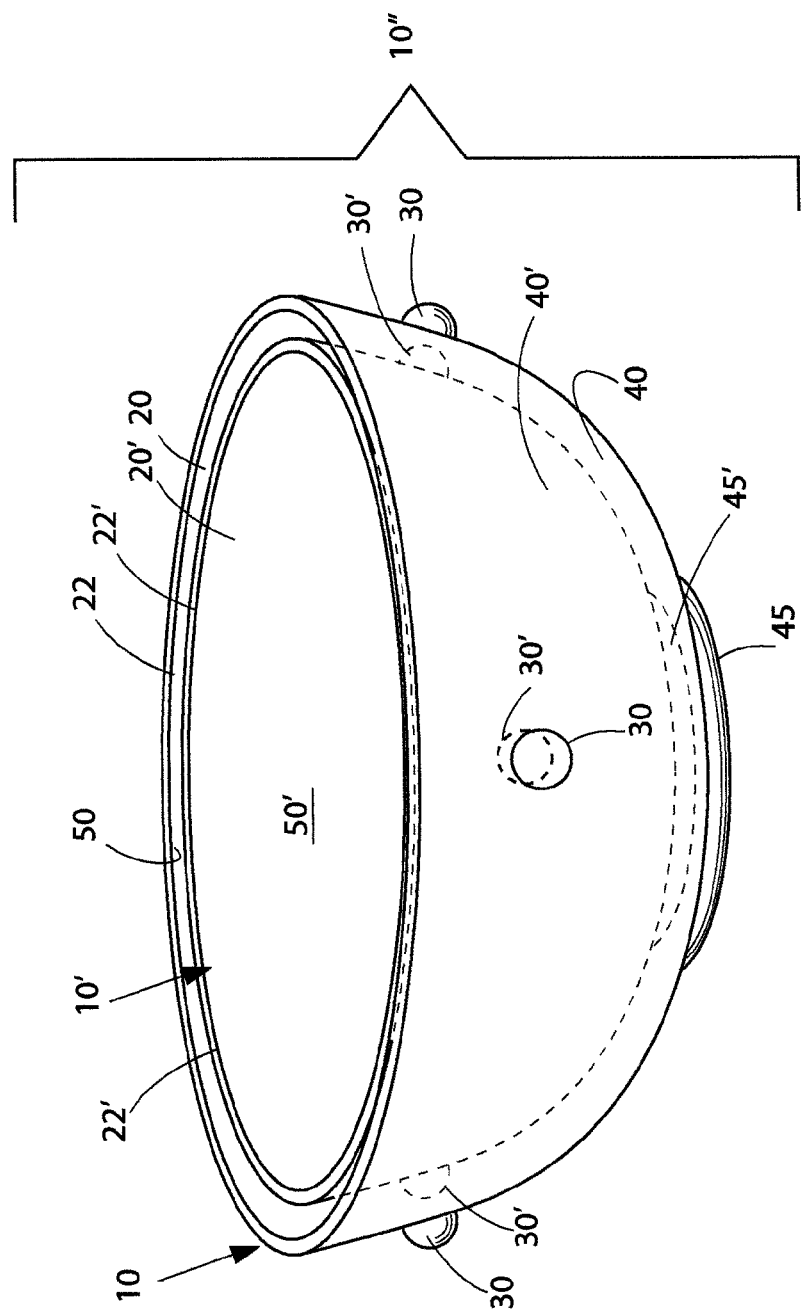
FIG. 3 is a front perspective view illustrating the first bowl of FIG. 1 and the second bowl of FIG. 2 in a bowl assembly of the invention.

FIG. 3 illustrates first bowl 10 and second bowl 10' forming a bowl assembly 10". Such bowl assembly 10" may be formed after the bowls 10, 10' have been washed in hot water and are in an expanded state. In this stacked or nested state, first bowl 10 is the outer bowl and second bowl 10' is the inner bowl. As is apparent, first bowl or outer bowl 10 has a diameter that is greater than the diameter of second bowl or inner bowl 10'.

Figure 4:
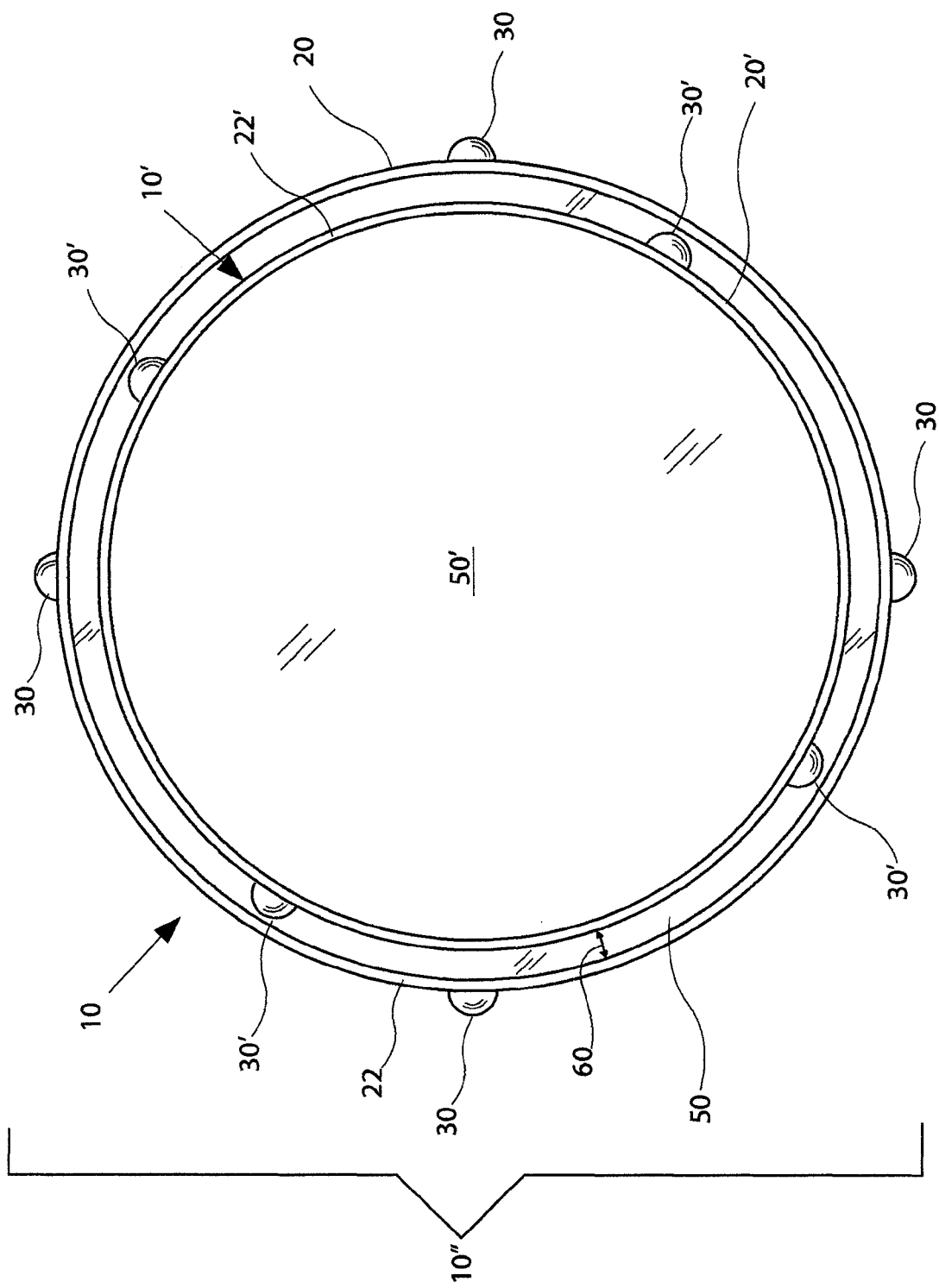
FIG. 4 is a top plan view of the bowl assembly of FIG. 3.

FIG. 4 further illustrates the stacked or nested relationship of the bowl assembly 10" of FIG. 3. As shown in FIG. 4, the protuberances 30' on the outer surface 40' of side wall 20' of second bowl 10' contact and abut against the inside surface 50 of outer or first bowl 10. This relationship defines a gap 60 indicated in FIG. 4 by a double headed arrow. Gap 60 spaces the side wall 20' of the inner bowl or second bowl 10' away from the side wall 20 of the outer bowl or first bowl 10.

As is apparent, in general, the abutting engagement of the protuberances on the outer surface of one bowl and the inside surface of another bowl to form a stacked or nested relationship between the two bowls will space and form a spacing or gap between the side wall of the inside bowl and the side wall of the outer bowl. When the bowls are hot as, for example, after washing, this spacing or gap will accommodate the differences in expansion and contraction of the two bowls 10, 10' during the cooling process.

In general, the outer bowl generally cools faster than the inner bowl. This phenomenon occurs in that the outer bowl is more exposed to the surrounding environment and thus blankets the inner bowl, resulting in the outer bowl cooling faster than the inner bowl. In view of the present invention, this difference in the cooling rates of the outer bowl and the inner bowl will not cause the bowls to jam together after the cooling process is complete. The gap 60 formed between the first bowl 10 and the second bowl 10' of the bowl assembly 10" of the invention tends to lessen the difference in cooling rates between the two bowls since air can flow through the gap 60, thereby conducting the heat away from the inner bowl 10'. Without the protuberances 30' of inner bowl 10' the heat generally is not conducted away from the bowl assembly 10" in the instance when the two bowls 10, 10' are jammed together With the convection heat transfer associated with the gap 60, the two bowls 10, 10' will cool generally at the same rate compared to the instance when one bowl is jammed inside the other bowl. That is, when the bowls are jammed together, the side wall of the outer bowl covers the side wall of the inner bowl such that the heat can only be transferred from the side wall of the inner bowl through the side wall of the outer wall with the heat transfer constant of the side wall of the inner bowl being affected by the heat transfer constant of the side wall of the outer bowl.

The size of the protuberances 30, 30' strongly influences their effectiveness. If the protuberances 30, 30' are too small, the heat transfer between the outer surface of the inner bowl and the inner surface of the outer bowl will be insufficient to allow proper cooling of the inner bowl relative to the outer bowl, particularly, when the cooling rate of the two bowls is different from each other. In this instance, the two bowls are likely to jam together during the cooling process. This condition defeats the purpose of the protuberances 30, 30'. Additionally, if the protuberances 30, 30' are too small, the outer surface of the inner bowl may still come into abutting contact with the inside surface of an outer bowl, thereby still causing jamming of the two bowls 10, 10' together. However, if the protuberances are too large, they will interfere with the efficiency of the bowls themselves by requiring bowls which are either too large to be efficient and/or too large for efficient storage of the bowl assembly 10".

The inventors have found that the critical spacing between the adjacent stacked mixing bowls 10, 10' is at least one-fourth (¼) inch. This dimension is large enough to permit proper relative cooling of the bowls while not requiring the bowls to be so large as to be inefficient. The one-fourth (¼) inch clearance requires the radius of the semi-spherical protuberances 30, 30' to be sufficient to define this one-fourth (¼) inch gap between the two bowls 10, 10'. In an embodiment of the invention, the radius of the protuberances 30, 30' is at least one-fourth (¼) inch. In an embodiment of the invention, it is important the protuberances 30, 30' be located on the side wall 20, 20' at the centerline thereof, whereby they protrude outwardly from the outer surface 40, 40' of bowl 10,10', respectively by approximately one-fourth (¼) inch in order for the protuberances 30' of the inner bowl 10' to abut the inner surface 50' of the outer bowl 10, and in order to define a gap 60 between the two bowls 10, 10' of approximately one-fourth (¼) inch. The inventors have found that having three or four protuberances 30, 30' evenly spaced away from each other around the circumference of the bowls, allows the bowls to be efficiently stacked both for cooling purposes after washing and for storing of the bowl assembly 10". In the invention, three protuberances may be suitable for small bowls, and four protuberances may be suitable for larger bowls. In a preferred embodiment of the invention and as shown in FIG. 4, the inner bowl 10' has four protuberances 30' and the outer bowl 10 has four protuberances 30. With regard to the inner bowl 10', a first pair of the four protuberances 30' are located diametrically opposite to each other and a second pair of the four protuberances 30" are located diametrically opposite relative to each other. Likewise, a first pair of the four protuberances 30 of the outer bowl 10 are located diametrically opposite relative to each other and a second pair of the four protuberances 30 are located diametrically opposite relative to each other.

In an embodiment of the invention, the first bowl 10 and the second bowl 10' are made of a material selected from the group consisting of stainless-steel, plastic, and glass, and wherein the protuberances on the first bowl and the protuberances on the second bowl are formed of the same material as the material of the first bowl and the second bowl. In an embodiment of the invention, the first bowl 10 and second bowl 10' are made of stainless-steel and the protuberances 30, 30' are made of stainless steel. In an embodiment of the invention, the protuberances 30, 30' are formed on the outer surface 40, 40' of side wall 20, 20' respectively, during the manufacturing process of bowls 10, 10'.

While the present invention has been described in connection with the preferred embodiments of the various figures, it is to be understood that other similar embodiments may be used or modifications and additions may be made to the described embodiments for performing the same function of the present invention without deviating there from. Accordingly, it is intended by the appended claims to cover a such changes and modifications to come within the spirit and scope of the invention.

What is claimed is:

1. A mixing bowl assembly, comprising:
   a first mixing bowl, comprising:
   a side wall having an inner surface, an outer surface, and a rim;
   at least four protuberances extending outwardly from the outer surface of the side wall and mid-way down the length of the side wall of the first mixing bowl and circling around the outer surface of the first mixing bowl;
   each protuberance being semi-spherical in shape and having a radius measuring at least one-fourth inch; and
   a first pair of the four protuberances of the first mixing bowl being located diametrically opposite each other, and a second pair of the four protuberances of the first mixing bowl being located diametrically opposite each other along the outer surface of the side wall of the first mixing bowl; and
   a second mixing bowl, comprising:
   a side wall having an inner surface, an outer surface, and a rim;
   at least four protuberances extending outwardly from the outer surface of the side wall and mid-way down the length of the side wall of the second mixing bowl and circling around the outer surface of the second mixing bowl;
   each protuberance being semi-spherical in shape and having a radius measuring at least one-fourth inch; and
   a first pair of the four protuberances of the second mixing bowl being located diametrically opposite each other, and a second pair of the four protuberances of the second bowl being located diametrically opposite each other along the outer surface of the side wall of the second mixing bowl,
   the first mixing bowl having a diameter larger than the diameter of the second mixing bowl and the second mixing bowl arranged within the first mixing bowl to define a gap with a clearance dimension of about one-fourth inch between the inner surface of the first mixing bowl and the outer surface of the second mixing bowl.

2. The mixing bowl assembly of claim 1, wherein the first mixing bowl and the second mixing bowl are made of a material selected from the group consisting of stainless-steel, plastic, and glass, and wherein the protuberances on the first mixing bowl and the protuberances on the second mixing bowl are formed of the same material as the material of the first bowl and the second bowl.

3. The bowl assembly of claim 2, wherein the material of the first mixing bowl and the material of the second mixing bowl is stainless steel.

* * * * *